Lee O. Heflinger
Ralph F. Wuerker
INVENTORS

BY Edward Dugas
AGENT

Lee O. Heflinger
Ralph F. Wuerker
INVENTORS

BY *Edward Dugas*

AGENT

United States Patent Office 3,492,858
Patented Feb. 3, 1970

3,492,858
MICROBALANCE
Lee O. Heflinger, Torrance, and Ralph F. Wuerker, Palos
Verdes Estates, Calif., assignors to TRW Inc., Redondo
Beach, Calif., a corporation of Ohio
Filed May 8, 1967, Ser. No. 636,796
Int. Cl. G01m 7/00
U.S. Cl. 73—67.2                    9 Claims

ABSTRACT OF THE DISCLOSURE

A reed is vibrated by minute vibrations of a base frame which, in turn, is vibrated by a driver means. The vibration of the reed is picked off and fed back to the driver means, causing the base frame to be vibrated at the resonant frequency of the reed. A counter is connected to the feedback loop to measure the frequency of the reed oscillations. By adding the mass to be weighed to the reed, the resonant freqeuncy of the reed will be changed, which will in turn change the reading at the counter by an amount which is proportional to the added mass.

---

The invention described herein was made in the performance of work under a NASA contract and is subject to the provisions of Section 305 of the National Aeronautic and Space Act of 1958, Public Law 85–568 (72 Stat. 435; 42 U.S.C. 2457).

BACKGROUND OF THE INVENTION

This invention pertains to the field of microbalances and, more particularly, to microbalances that utilize vibrating or oscillating elements. Various types of ultramicro balances exist in the prior art. One such device is disclosed in U.S. Patent 2,842,351, entitled "Coarse Fiber Torsion Ultramicrobalance," by J. A. Rodder. In that patent, a quartz fiber is attached to a beam. Weighing pans are suspended from the beam and the quartz fiber is twisted as the pans are loaded. A balance is achieved by turning the twisted fiber until the beam is in a null position. One of the primary disadvantages of this type of balance is that the instrument is susceptible to vibration and aid currents. For measurements in the microgram range, the measurement time is quite long, approximately several hours. It is therefore highly desirable to have a microbalance which provides an almost instantaneous reading as an output. Also, in the prior art is the concept of weighing small masses by applying the small mass to an oscillating or vibrating element and detecting the change in the amplitude of the oscillation caused by the increased mass. Such a device is disclosed in U.S. Patent 2,305,783, entitled "Means for Determining the Weight of Bodies," by H. Heymann, et al. In the device of that patent, a plate which is supported by springs is set into oscilltaion, and an electrodynamic vibration pickup unit senses the amplitude of the oscillation. A mass added to the plate changes the amplitude of oscillation and this change is proportional to the added mass. This particular technique of noting the change in the amplitude of vibration is not particularly adaptable to microgram-size particles due to the difficulty in determining the change in amplitude caused by the additional weight of the sample under measurement. But, devices utilizing an oscillatory movement have the advantage of eliminating or diminishing to a great degree the friction of the fulcrum during the weighing operation.

Three additional prior art patents worthy of mention are disclosed in U.S. Patents 3,100,390, 3,145,559 and 3,272,084, all of which were invented by W. B. Banks. In each of these patents a paddle is supported on the ends of two rods. One of the rods is driven at a frequency corresponding to the resonant frequency of at least one of the rods and the amplitude or frequency imparted to the other rod is picked off to provide an indication of the properties of any material that is in contact with the paddle. A distinct disadvantage is encountered with this particular device in that the one rod must drive not only the mass or sample undergoing weighing, but it must also drive the paddle and the other rod which is connected to the paddle for the purpose of providing a pickoff indication. The instrument is theerfore less sensitive to mass changes.

SUMMARY OF THE INVENTION

In a preferred embodiment of the invention, the problem defined above are efficiently solved by mounting a reed to a base frame and attaching a driver to the base frame such that the driver vibrates the base frame and the reed. A pickoff detects the frequency of vibration of the reed and feeds the frequency signal back through a closed loop, driving the driver at the frequency of the reed. The driver, base frame and reed are thereby vibrated at the resonant frequency of the reed. Placement of a particle to be measured on the end of the reed alters the reed frequency in proportion to the mass of the particle and thus a mass change may be read by detecting the frequency at which the reed vibrates. Applicants' microbalance has the capability of weighing particles in the 1 microgram to 100 micrograms range with accuracies of $\frac{1}{10}$ microgram at the low end of the range. A bi-morph crystal may be used as the driver, eliminating the frequency pulling effects caused by magnetic or electrostatic forces when those types of drivers are used.

Accordingly, it is an object of the present invention to provide a novel microbalance which overcomes the disadvantages of the prior art devices and which is capable of efficiently measuring microgram particles.

It is a further object of the present invention to provide an apparatus for determining the mass of a particle by detecting the change in frequency of a vibratory element when the particle is secured to the vibratory element.

Another object of the present invention is the provision of an instrument for the measurement of a relatively small mass by vibratory means.

The aforementioned and other objects of the present invention will become more apparent when taken in conjunction with the following description and drawings, throughout which like characters indicate like parts and which drawings form a part of this application.

DESCRIPTION OF THE PREFERRED EMBODIMENTS

Figure 1:
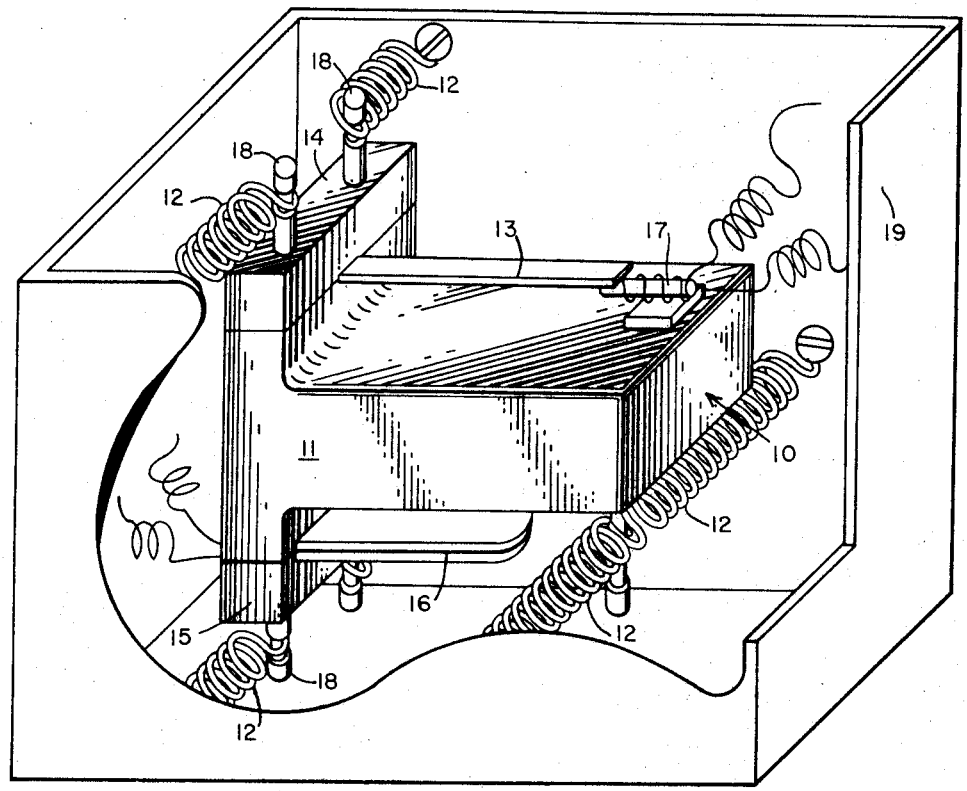
FIGURE 1 illustrates in perspective view, partially sectioned, a preferred embodiment of the invention.
Figure 2:
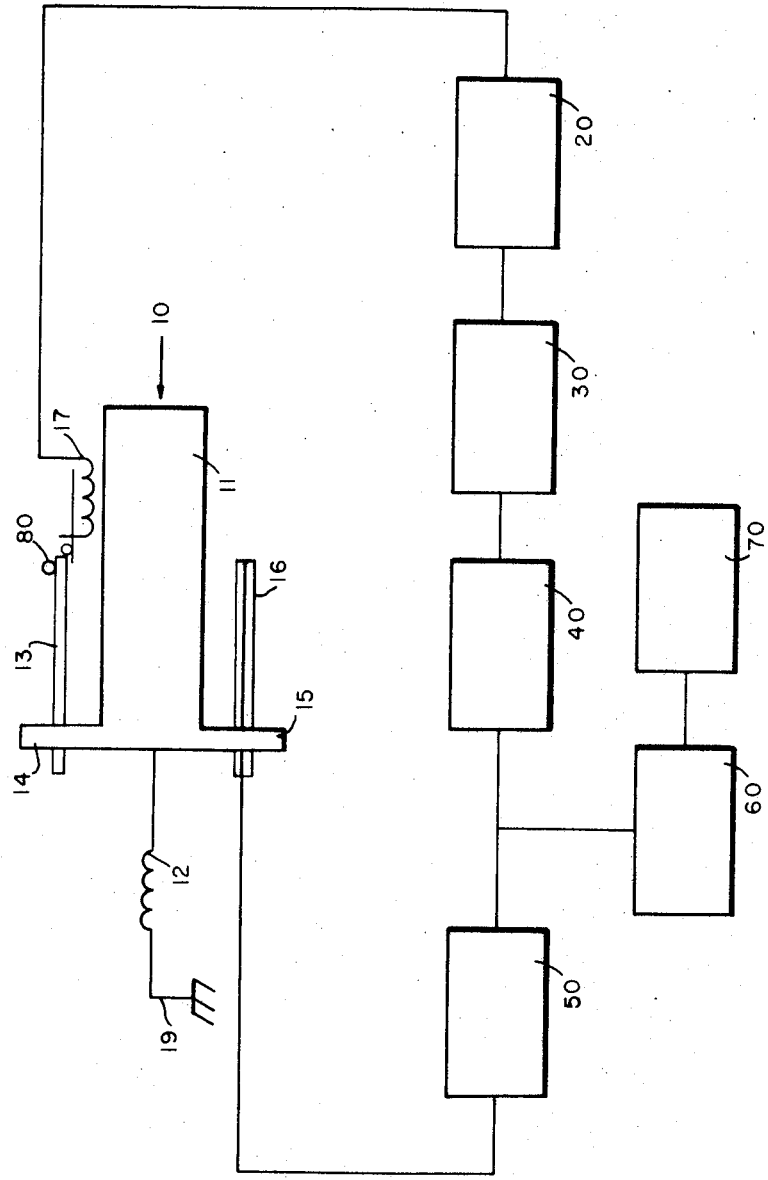
FIGURE 2 is a block diagram of the embodiment illustrated in FIGURE 1.

Referring now to FIGURES 1 and 2, the microbalance 10 is supported from a reference frame 19 by means of springs 12. The microbalance 10 is comprised of a main body or base member 11, a vibrating element 13 fixedly attached to the body member 11 by means of a clamp 14 and attaching screws 18, and a pickoff 17 for detecting the vibrations of the reed 13, along with a driver 16 which is fixedly attached to the base frame by means of a clamping member 15 and attaching screws 18.

The output from the pickup coil 17 is fed to a pre-amplifier 20 which amplifies any signal present on its input and feeds this amplified signal to a phase shifter 30 and from there to an amplifier 40, and thereto to a limiter 50 which drives the crystal driver 16 at a frequency corresponding to the vibrational frequency of the element 13. The driver 16 imparts a low amplitude vibration to the main frame 11 which, in turn, vibrates the vibrational element 13 at its resonant frequency. Small amplitudes of vibration are desired, because the acceleration of a particle being weighed will be small and a minimal attachment force will be necessary to keep the particle on the reed. A bimorph crystal-type drive is preferably used for the driver 16 because the frequency of the reed is not influenced, as would be the case if a magnetic drive or electrostatic driver were used. The bimorph crystal consists of two thin ceramic crystals of lead zirconate titanate, bonded to each other along their entire length. The two crystal components are oppositely polarized so that when a voltage is applied, one crystal expands while the other contracts, resulting in microscopic bending of the crystal driver unit. Each face of the crystal may be coated with silver, thereby providing an electrode to which connecting wires may be attached.

The natural frequency of the bimorph crystal driver 16 can be adjusted for optimum results to be approximately the same frequency as the frequency of the vibratory element 13. This adjustment may be accomplished by adding mass to the free end of the unclamped crystal. Further, since the Q of the ceramic bimorph driver is far lower than the Q of the reed, the frequency of oscillation is almost completely controlled by the reed, and the change of frequency with mass remains substantially linear over the operating range of the instrument.

The addition of a particle 80 which is ready to undergo weighing to the end of the reed causes the natural frequency of the reed to decrease in proportion to the mass of the particle. The counter 70 which is connected to the filter 60 to the output of the amplifier 40, measures the vibration period of the reed 13 averaged over a number of cycles. The difference between the periods before and after adding the particle, multiplied by a calibration constant, gives the mass of the particles. The particle 80 is caused to adhere to the reed 13 by the presence of a minute film of grease, such as the greases used in vacuum work, which is applied to the end of the reed. For this reason, a weighing is made from the difference of periods before and after adding a particle. The period reading typically shows that a 0.1 microgram or less of grease has been removed.

The vibrating element or reed may be made from Elinvar, which is manufactured by the Hamitlon Watch Company. In the particular embodiment disclosed, the dimensions of this reed were 19 mm. x 0.5 mm. x 0.16 mm., and the reed has a natural frequency of 324 cycles per second. Elinvar has the characteristic of having a controlled elastic coefficient such that the frequency vibrations when used in a vibrating spring mass system is substantially insensitive to temperature changes. The vibration of the reed is detected as previously stated by the pickoff 17, which is a small coil that senses the residual magnetism of the Elinvar. The bimorph crystal driver used in the embodiment shown had the dimensiosn of 32 mm. x 13 mm. x 0.6 mm. The mounting clamp 15 at one end reduces the vibrating length by 6 mm. Various types of drivers may be used to impart the required motion to the main frame 11. For example, the required motion may be obtained for any of a number of types of electromagnetic vibrators. In particular, the permanent magnet-electro coil combination of a standard speaker may be used. It will also be obvious that both the reed and the driver element may be mounted in other configurations than the cantilevered configuration that is shown in the drawings.

Figure 3:
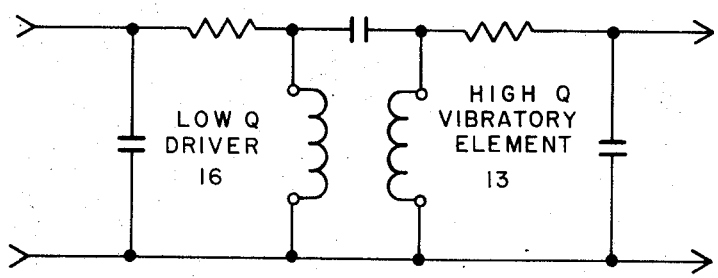
FIGURE 3 illustrates in schematic form a circuit that may be used with the invention.
Figure 4:
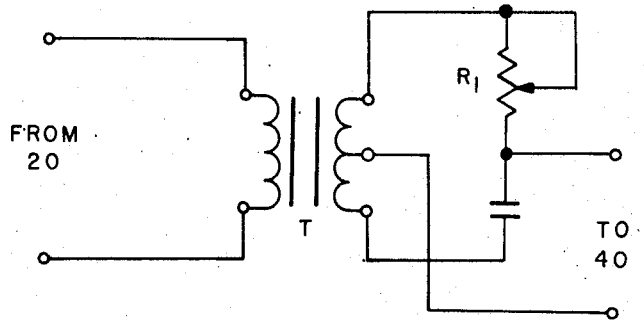
FIGURE 4 illustrates in schematic form a circuit that may be used with the invention.

Referring now to FIGURE 3, the electrical analog of the microbalance 10 is shown simply as a double tuned coupled circuit. The Q of the input tuned circuit is low corresponding to the low Q of the driver 16. The Q of the output resonant circuit is very high, corresponding to the high Q of the Elinvar reed. The coupling coefficient between the resonant circuits is determined by the inertia of the main frame 11. In the constructed version, the mass of the main frame 11 is sufficiently large so that the assembly 10 operates well below critical coupling as determined by plotting the output response for a constant amplitude swept frequency input. The dimensions of the main frame member 11 are 5 cm. x 2.5 cm. x 1.25 cm., and the material originally used was aluminum. The preamplifier 20 was a transistor audio-amplifier having a voltage gain of 500. The output amplifier 40 had a voltage gain of 70. The phase shifter circuit 30 is illustrated in detail in FIGURE 4. As utilized, this circuit introduced a voltage loss of 11.

The phase shifter adjusts the phase around the oscillation loop so that the oscillations occur at the resonant frequency of the reed.

Figure 5:
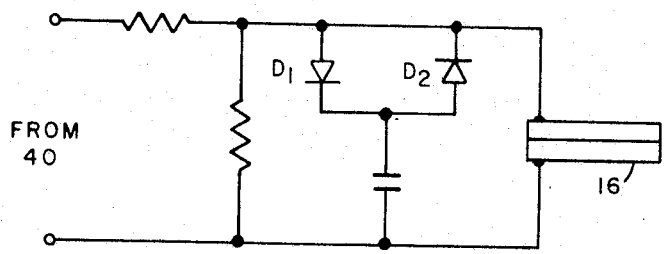
FIGURE 5 illustrates in schematic form a circuit that may be used with the invention.

A potentiometer R1 is shown connected in series with capacitor C across the secondary of the transformer T. In operation, the potentiometer R1 was adjusted for maximum oscillation strength with a fixed gain setting. It is obvious that once the correct setting for potentiometer R1 is found, it is no longer necessary to change its value. In FIGURE 5, the limiter 50 consists of two silicon diodes, D1 and D2, connected in parallel, in a back-to-back configuration, such that the voltage appearing across the bimorph crystal 16 is limited. In application, the voltage was limited to approximately 1.4 volts peak to peak. The main function of the limiter is to set the amplitude of vibration. A small amplitude of vibration, as noted earlier, is desirable since it reduces the required attachment forces. A constant amplitude is also desirable to reduce or eliminate residual frequency shifts due to nonlinearities of the effective spring constant of the vibrating reed (due to the magnetic force from the "mu," metal core in the pickup coil). With a given limiter, the amplitude can be controlled over a small range by the amplifier gain control. While a separate limiter is shown here, it will be obvious that the limiting properties of the amplifiers could be used instead of a separate limiter.

Figure 6:
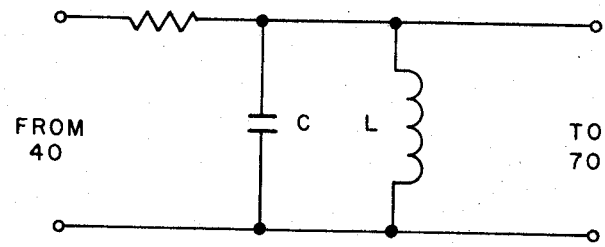
FIGURE 6 illustrates in schematic form a circuit that may be used with the invention.

Referring to FIGURE 6, the filter 60 is a simple LC tank circuit tuned to the resonant frequency of the reed without the added particle mass. Its function is to remove most of the amplifier noise by limiting the band width before the signal enters the counter 70.

The calibration constant of the instrument was determined by weighing a known mass. The mass of the calibration weight was typically 120 micrograms. The calibration of the instrument, as well as its linearity, was separately checked by weighing small spheres of titanium. The mass of these spheres was calculated using published values for the density of titanium and multiplied by their volume calculated from the diameter measured with a microscope with a filar eyepiece.

What is claimed is:
1. Apparatus capable of weighing a mass as small as on the order of between 1 to 100 micrograms comprising:
   (a) a vibratory element having a surface for supporting the mass to be weighed, thereby to change its resonant frequency;
   (b) a base member having an inertia greater than that of said vibratory element for supporting said vibratory element in a resonant mode;
   (c) a vibratory driver secured to said base member for vibrating said base member and thereby said vibratory element;
   (d) pickup means disposed adjacent said vibratory element for sensing the motion thereof and providing an output signal indicative of the vibration there- of, said vibration varying in accordance with the mass to be weighed;

(e) feedback means coupling said pickup means to said driver, said feedback means being arranged to drive said driver substantially at the resonant frequency of said vibratory element, said base member having a mass so large that the vibratory system, including said base member, said vibratory element and said driver operate below critical coupling; and (f) means coupled to said feedback means for detecting a change in the vibration of said vibratory element.

2. Apparatus as defined in claim 1 wherein said driver includes a bimorph crystal secured to said base member.

3. Apparatus as defined in claim 1 wherein said vibratory element consists of a reed attached to said base member.

4. Apparatus as defined in claim 1 wherein the Q of said vibratory element is greater than the Q of said driver so that said vibratory element will always be driven at its resonant frequency with or without a mass supported thereby.

5. Apparatus as defined in claim 1 wherein said driver has substantially the resonant frequency of said vibratory element, but is capable of being driven at different frequencies.

6. Apparatus capable of weighing a mass as small as on the order of between 1 and 100 micrograms comprising:

(a) a fixed frame;
(b) a base member suspended from said fixed frame so as to be capable of being vibrated;
(c) a vibratory element supported by said member and capable of vibrating in a resonant mode, said vibratory element having a surface for supporting the mass to be weighed;
(d) a driver secured to said base member for vibrating said base member substantially at the resonant frequency of said vibratory element;
(e) a pickup disposed adjacent said vibratory element for detecting the frequency thereof and developing a signal representative of said frequency;
(f) a feedback path coupled between said pickup element and said driver for forcing said driver to vibrate at the frequency of said vibratory element which depends on its mass, the mass of said base element being large compared to that of said vibratory element and said driver, so that the assembly consisting of said base element, said vibratory element and said driver operates below critical coupling; and
(g) means coupled to said feedback path for detecting the frequency at which said vibratory element vibrates.

7. Apparatus as defined in claim 6 wherein said feedback path includes a limiter for limiting the amplitude of the signal impressed on said driver.

8. Apparatus as defined in claim 6 wherein said feedback path includes a phase shifter for adjusting the phase of the signal applied to said driver, thereby to drive said assembly at the resonant frequency of said vibrating element.

9. Apparatus as defined in claim 6 wherein said vibratory element and said driver are secured to opposite surfaces of said base member, thereby to isolate said vibratory element from said driver.

References Cited

UNITED STATES PATENTS

| 2,356,894 | 8/1944 | Sims | 73—67.2 XR |
| 2,496,632 | 2/1950 | Lazan | 73—67.3 |
| 3,100,390 | 8/1963 | Banks | 73—32 |

FOREIGN PATENTS

| 1,034,475 | 6/1966 | Great Britain. |

RICHARD C. QUEISSER, Primary Examiner

JOHN P. BEAUCHAMP, Assistant Examiner

U.S. Cl. X.R.

177—1, 210